US006628813B2

(12) United States Patent
Scott et al.

(10) Patent No.: US 6,628,813 B2
(45) Date of Patent: Sep. 30, 2003

(54) INDIVIDUALIZED FINGERPRINT SCANNER

(75) Inventors: Walter Guy Scott, North Palm Beach, FL (US); Dean J. Fedele, Jupiter, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 09/759,344

(22) Filed: Jan. 16, 2001

(65) Prior Publication Data

US 2001/0033677 A1 Oct. 25, 2001

Related U.S. Application Data

(63) Continuation of application No. 09/067,792, filed on Apr. 28, 1998, now Pat. No. 6,178,255.

(51) Int. Cl.[7] .................................................. G06K 9/00
(52) U.S. Cl. ........................ 382/124; 382/127; 356/71
(58) Field of Search ................................. 382/115, 116, 382/124–127; 356/71; 250/556; 376/15; 707/6, 9; 713/186.2

(56) References Cited

U.S. PATENT DOCUMENTS

| | | | |
|---|---|---|---|
| 2,500,017 A | 3/1950 | Altman | 88/57 |
| 3,200,701 A | 8/1965 | White | 88/14 |
| 3,482,498 A | 12/1969 | Becker | 95/12 |
| 3,527,535 A | 9/1970 | Monroe | 356/71 |
| 3,617,120 A | 11/1971 | Roka | 353/28 |
| 3,699,519 A | 10/1972 | Campbell | 340/146.3 E |
| 3,947,128 A | 3/1976 | Weinberger et al. | 356/71 |
| 3,968,476 A | 7/1976 | McMahon | 340/146.3 E |
| 4,032,975 A | 6/1977 | Malueg et al. | 358/213 |
| 4,063,226 A | 12/1977 | Kozma et al. | 365/125 |
| 4,210,899 A | 7/1980 | Swonger et al. | 340/146.3 E |
| 4,414,684 A | 11/1983 | Blonder | 382/4 |
| 4,537,484 A | 8/1985 | Fowler et al. | 354/62 |
| 4,544,267 A | 10/1985 | Schiller | 356/71 |
| 4,601,195 A | 7/1986 | Garritano | 73/60 |
| 4,669,487 A | 6/1987 | Frieling | 128/774 |
| 4,681,435 A | 7/1987 | Kubota et al. | 356/71 |
| 4,783,823 A | 11/1988 | Tasaki et al. | 382/4 |
| 4,784,484 A | 11/1988 | Jensen | 356/71 |
| 4,792,226 A | 12/1988 | Fishbine et al. | 356/71 |
| 4,811,414 A | 3/1989 | Fishbine et al. | 382/52 |
| 4,876,726 A | 10/1989 | Capello et al. | 382/4 |
| 4,924,085 A | 5/1990 | Kato et al. | 250/227.28 |
| 4,933,976 A | 6/1990 | Fishbine et al. | 382/4 |
| 4,942,482 A | 7/1990 | Nakinuma et al. | 358/474 |
| 4,995,086 A | 2/1991 | Lilley et al. | 382/4 |
| 5,054,090 A | 10/1991 | Knight et al. | 382/4 |
| 5,067,162 A | 11/1991 | Driscoll, Jr. et al. | 382/5 |
| 5,067,749 A | 11/1991 | Land | 283/117 |

(List continued on next page.)

FOREIGN PATENT DOCUMENTS

| | | | | |
|---|---|---|---|---|
| EP | 0 101 772 A1 | 3/1984 | | G07C/9/00 |
| EP | 0 308 162 A2 | 3/1989 | | A61B/5/10 |
| EP | 0 379 333 B1 | 7/1990 | | G07F/7/10 |

(List continued on next page.)

OTHER PUBLICATIONS

Btt (Biometric Technology Today), Finger technologies contacts, Publisher Sarah Clark, sclark@sjbresearch.com, 2 pages.

(List continued on next page.)

Primary Examiner—Yon J. Couso
(74) Attorney, Agent, or Firm—Sterne, Kessler, Goldstein & Fox PLLC

(57) ABSTRACT

A method and apparatus whereby a fingerprint verifier has a mechanism to slide a prism over an imaged area of a camera. The position of the prism being determined by a binary absolute linear code on a sliding mechanism imaged by the same camera at the side of the fingerprint wherein the images are knitted together to simulate a large CCD.

73 Claims, 9 Drawing Sheets

U.S. PATENT DOCUMENTS

| | | | |
|---|---|---|---|
| 5,131,038 A | 7/1992 | Puhl et al. | 380/23 |
| 5,146,102 A | 9/1992 | Higuchi et al. | 250/556 |
| 5,187,747 A | 2/1993 | Capello et al. | 382/4 |
| 5,222,152 A | 6/1993 | Fishbine et al. | 382/2 |
| 5,230,025 A | 7/1993 | Fishbine et al. | 382/4 |
| 5,233,404 A | 8/1993 | Lougheed et al. | 356/71 |
| 5,249,370 A | 10/1993 | Stanger et al. | 34/22 |
| D348,445 S | 7/1994 | Fishbine et al. | D14/107 |
| D351,144 S | 10/1994 | Fishbine et al. | D14/107 |
| 5,384,621 A | 1/1995 | Hatch et al. | 355/204 |
| 5,412,463 A | 5/1995 | Sibbald et al. | 356/71 |
| 5,416,573 A | 5/1995 | Sartor, Jr. | 356/71 |
| 5,448,649 A * | 9/1995 | Chen et al. | 382/126 |
| 5,467,403 A | 11/1995 | Fishbine et al. | 382/10 |
| 5,469,506 A | 11/1995 | Berson et al. | 380/23 |
| 5,473,144 A | 12/1995 | Mathurin, Jr. | 235/380 |
| 5,509,083 A | 4/1996 | Abtahi et al. | 382/124 |
| 5,517,528 A | 5/1996 | Johnson | 375/259 |
| 5,528,355 A | 6/1996 | Maase et al. | 356/71 |
| 5,548,394 A * | 8/1996 | Giles et al. | 356/71 |
| 5,591,949 A | 1/1997 | Bernstein | 235/380 |
| 5,596,454 A | 1/1997 | Hebert | 359/726 |
| 5,598,474 A | 1/1997 | Johnson | 380/23 |
| 5,613,014 A | 3/1997 | Eshera et al. | 382/124 |
| 5,615,277 A | 3/1997 | Hoffman | 382/115 |
| 5,625,448 A | 4/1997 | Ranalli et al. | 356/71 |
| 5,640,422 A | 6/1997 | Johnson | 375/259 |
| 5,649,128 A | 7/1997 | Hartley | 395/309 |
| 5,650,842 A | 7/1997 | Maase et al. | 356/71 |
| 5,661,451 A | 8/1997 | Pollag | 340/426 |
| 5,680,205 A * | 10/1997 | Borza | 356/71 |
| 5,689,529 A | 11/1997 | Johnson | 375/259 |
| 5,717,777 A | 2/1998 | Wong et al. | 382/124 |
| 5,732,148 A * | 3/1998 | Keagy et al. | 382/124 |
| 5,745,684 A | 4/1998 | Oskouy et al. | 395/200.8 |
| 5,748,766 A | 5/1998 | Maase et al. | 382/124 |
| 5,755,748 A | 5/1998 | Borza | 607/61 |
| 5,778,089 A | 7/1998 | Borza | 382/124 |
| 5,781,647 A | 7/1998 | Fishbine et al. | 382/1 |
| 5,793,218 A | 8/1998 | Oster et al. | 324/754 |
| 5,805,777 A | 9/1998 | Kuchta | 395/112 |
| 5,812,067 A | 9/1998 | Bergholz et al. | 340/825.31 |
| 5,815,252 A | 9/1998 | Price-Francis | 356/1 |
| 5,818,956 A | 10/1998 | Tuli | 382/126 |
| 5,822,445 A | 10/1998 | Wong | 382/127 |
| 5,825,005 A | 10/1998 | Behnke | 235/380 |
| 5,825,474 A | 10/1998 | Maase | 356/71 |
| 5,828,773 A | 10/1998 | Setlak et al. | 382/126 |
| 5,832,244 A | 11/1998 | Jolley et al. | 395/309 |
| 5,848,231 A | 12/1998 | Teitelbaum et al. | 395/186 |
| 5,859,420 A | 1/1999 | Borza | 250/208.1 |
| 5,862,247 A | 1/1999 | Fisun et al. | 382/116 |
| 5,867,802 A | 2/1999 | Borza | 701/35 |
| 5,869,822 A | 2/1999 | Meadows, II et al. | 235/380 |
| 5,872,834 A | 2/1999 | Teitelbaum | 379/93.03 |
| 5,892,599 A * | 4/1999 | Bahuguna | 356/71 |
| 5,900,993 A | 5/1999 | Betensky | 359/710 |
| 5,907,627 A | 5/1999 | Borza | 382/124 |
| 5,920,384 A | 7/1999 | Borza | 356/71 |
| 5,920,640 A | 7/1999 | Salatino et al. | 382/124 |
| 5,928,347 A | 7/1999 | Jones | 710/129 |
| 5,942,761 A * | 8/1999 | Tuli | 356/71 |
| 5,960,100 A | 9/1999 | Hargrove | 382/124 |
| 5,973,731 A | 10/1999 | Schwab | 348/161 |
| 5,974,162 A | 10/1999 | Metz et al. | 382/124 |
| 5,987,155 A | 11/1999 | Dunn et al. | 382/116 |
| 5,995,014 A | 11/1999 | DiMaria | 340/825.31 |
| 6,018,739 A | 1/2000 | McCoy et al. | 707/102 |
| 6,023,522 A | 2/2000 | Draganoff et al. | 382/124 |
| 6,038,332 A * | 3/2000 | Fishbine et al. | |
| 6,041,372 A | 3/2000 | Hart et al. | 710/62 |
| 6,075,876 A | 6/2000 | Draganoff | 382/124 |
| 6,078,265 A | 6/2000 | Bonder et al. | 340/825.31 |
| 6,088,585 A | 7/2000 | Schmitt et al. | 455/411 |
| 6,104,809 A | 8/2000 | Berson et al. | 380/23 |
| 6,259,108 B1 * | 7/2001 | Antonelli et al. | 356/71 |

FOREIGN PATENT DOCUMENTS

| | | | |
|---|---|---|---|
| EP | 0 379 333 A1 | 7/1990 | G07F/7/10 |
| EP | 0 623 890 A2 | 11/1994 | G06K/9/38 |
| EP | 0 889 432 A2 | 1/1999 | G06K/9/00 |
| EP | 0 905 646 A1 | 3/1999 | G06K/11/18 |
| EP | 0 924 656 A2 | 6/1999 | G07C/9/00 |
| GB | 2 089 545 A | 6/1982 | G06K/9/20 |
| GB | 2 313 441 A | 11/1997 | G06K/7/10 |
| WO | WO 87/02491 | 4/1987 | G07C/9/00 |
| WO | WO 90/03620 | 4/1990 | G06K/9/20 |
| WO | WO 92/11608 | 7/1992 | G06K/9/00 |
| WO | WO 94/22371 | 10/1994 | A61B/5/117 |
| WO | WO 96/17480 | 6/1996 | H04N/13/93 |
| WO | WO 97/29477 | 8/1997 | G09G/5/08 |
| WO | WO 97/41528 | 11/1997 | G06K/9/00 |
| WO | WO 98/09246 | 3/1998 | G06K/9/00 |
| WO | WO 98/12670 | 3/1998 | G07C/9/00 |
| WO | WO 99/12123 | 3/1999 | G06K/9/00 |
| WO | WO 99/26187 | 5/1999 | G06K/9/00 |
| WO | WO 99/40535 | 8/1999 | G06K/9/00 |

OTHER PUBLICATIONS

Drake, M.D. et al., "Waveguide hologram fingerprint entry device," *Optical Engineering*, vol. 35, No. 9, Sep. 1996, Copyright 1996, Society of Photo–Optical Instrumentation Engineers, pp. 2499–2505.

Roethenbaugh, G. (ed.), *Biometrics Explained*, 1998, ICSA, Inc. pp. 1–34.

*Automated Identification Systems* (visited May 20, 1999) <http://www.trw.com/idsystems/bldgaccess2.html>, 1 page, Copyright 1999, TRW Inc.

*Ultra–Scan Corporation Home Page* (visited May 20, 1999) <http://www.ultra–scan.com/index.htm>, 3 pages. (discusses technology as early as 1996).

*Profile* (last updated Aug. 16, 1998) <http://www.dermalog.de/Britain/Profile/profile.htm>, 3 pages. (discusses technology as early as 1990).

*ID–Card System Technical Specifications* (last updated Jul. 18, 1998) <http://www.dermalog.de/Britain/Products/ID-Card/idcard2.htm>, 2 pages.

*Fujitsu Limited Products and Services* (updated Apr. 21, 1999) <http://www.fujitsu.co.jp/hypertext/Products/index-e.html>, 3 pages, Copyright 1995–1999, Fujitsu Limited.

*SonyDCam* (visited May 20, 1999) <http://www.microsoft.com/DDK/ddkdocs/Win2k/sonydcam.htm>, 3 pages, Copyright 1999, Microsoft Corporation.

*Verid Fingerprint Verification* (visited May 17, 1999) <http://www.tssi.co.uk/products/finger.html>, 2 pages.

*Startek's Fingerprint Verification Products: Fingerguard FG–40* (visited May 18, 1999) <http://www.startek.com.tw/product/fg40/fg40.html>, 3 pages.

*SAC Technologies Showcases Stand–Alone SAC–Remote(TM)* (visited May 18, 1999) <http://www.pathfinder.com/money/latest/press/PW/1998Mar25/1026.html>, 2 pages.

"Biometrics, The Future Is Now," www.securitymagazine.com, May 1999, pp. 25–26.

*Mytec Technologies Gateway*, (visited Apr. 27, 1999) <http://www.mytec.com/Products/Gateway/>, 1 page.

*Mytex Technologies Gateway: Features & Benefits*, (visited Apr. 27, 1999) <http://www.mytec.com/Products/Gateway/features.htm>, 1 page.

*Mytec Technologies Touchstone Pro*, (visited Apr. 27, 1999) <http://www.mytec.com/Products/Touchstone/>, 1 page.

*Mytec Technologies Touchstone Pro: Features*, (visited Apr. 27, 1999) <http://www.mytec.com/Products/Touchstone/features.htm>, 1 page.

*Electronic Timeclock Systems and Biometric Readers* (last updated Apr. 17, 1999) <http://www.lfs–hr–bene.com/tclocks.html>, 1 page.

*Fingerprint Time Clock* (visited May 17, 1999) <http://www.lfs–hr–bene.com/Biometrics/Fingerprintclock.html>, 6 pages.

*KC–901: The KSI fingerprint sensor* (visited May 17, 1999) <http://www.kinetic.bc.ca/kc–901.html>, 3 pages.

*Intelnet Inc.* (visited May 20, 1999) <http://www.intelgate.com/index.html>, 1 page Copyright 1996, Intelnet Inc.

*Ver–i–Fus Fingerprint Access Control System* (visited May 20, 1999) <http://www.intelgate.com/verifus.htm>, 2 pages. (Ver–i–fus product released in 1995).

*Ver–i–fus® Configurations* (visited May 20, 1999) <http://www.intelgate.com/verconfig.htm>, 1 page. (Ver–i–fus product released in 1995).

*Ver–i–Fus® & Ver–i–Fus$^{mil®}$* (visited May 20, 1999) <http://www.intelgate.com/vif_data.htm>, 3 pages. (Ver–i–fus product released in 1995).

*Access Control System Configurations* (visited May 20, 1999) <http://www.intelgate.com/access.htm>, 2 pages. (Ver–i–fus product released in 1995).

*Company* (visited May 17, 1999) <http://www.instainfo.com/company.htm>, 2 pages.

*TouchLock™ II Fingerprint Identity Verification Terminal* (visited May 17, 1999) <http://www.identix.com/TLock.htm>, 4 pages.

*Physical Security and Staff Tracking Solutions* (visited May 17, 1999) <http://www.identix.com/products/biosecurity.html>, 3 pages, Copyright 1996–1998, Identix Incorporated.

*Veriprint2000 Fingerprint Verification Terminal For Use With Jantek Time & Attendance Software* (visited May 17, 1999) <http://www.hunterequipment.com/fingerprint.htm>, 2 pages.

*Veriprint Product Applications* (visited Apr. 27, 1999) <http://www.biometricid.com/uses.htm>, 1 page, Copyright 1999, Biometric Identification, Inc.

*BII Home Page* (visited Apr. 27, 1999) <http://www.biometricid.com/homepage.htm>, 1 page, Copyright 1999, Biometric Identification, Inc.

*Veriprint 2100 Stand–Alone Fingerprint Verification Terminal* (visited Apr. 27, 1999) <http://www.biometricid.com/veriprint2100.htm>, 3 pages.

Randall, N., "A Serial Bus on Speed," *PC Magazine*, May 25, 1999, pp. 201–203.

*The DERMALOG Check–ID* (visited Nov. 12, 1999) <http://www.dermalog.de/ganzneu/products_check.html>, 1 page.

*Check–ID Specifications and Features* (visited Nov. 12, 1999) <http://www.dermalog.de/ganzneu/spec_check.html>, 1 page, Copyright 1999, Dermalog GmbH.

*Startek's Fingerprint Verification Products FingerFile 1050* (visited Oct. 8, 1999) <http://www.startek.com.tw/product/ff1050/ff1050.html>, 3 pages.

*Time is Money!* (visited Jun. 5, 1998) <http://www.iaus.com/afim.htm>, 3 pages.

*LS 1 LiveScan Booking Workstation High Performance Finger & Palm Scanning System* (visited Jun. 4, 1998) <http://www.hbs–jena.com/ls1.htm>, 6 pages, Copyright 1998, HBS GmbH.

*Welcome to the Homepage of Heimann Biometric Systems GmbH* (visited Jun. 4, 1998) <http://www.hbs–jena.com/>, 1 page, Copyright 1998, HBS GmbH.

*Heimann Biometric Systems Corporate Overview* (visited Jun. 4, 1998) <http://ww.hbs–jena.com/company.htm>, 4 pages, Copyright 1998, HBS GmbH.

*Remote Access Positive IDentification—raPID* (visited Jun. 3, 1998) <http://www.nec.com...>, 2 pages, Copyright 1997.

*Morpho DigiScan Cellular* (visited Jun. 3, 1998) <http://www.morpho.com/products/law_enforcement/digiscan.cellular.htm>, 2 pages, Copyright 1998, Sagem Morpho, Inc.

*A.F.I.S.* (last updated Apr. 2, 1998) <http://www.dermalog.de/afis.htm>, 2 pages.

*Morpho FlexScan Workstation* (visited Jun. 3, 1998) <http://www.morpho.com/products/law_enforcement/flexscan/>, 2 pages, Copyright 1998, Sagem Morpho, Inc.

True–ID® The LiveScan with special "ability" . . . , The ITI Group of Companies, 2 pages.

*Printrak International: User List* (visited Jun. 3, 1998) <http://www.printrakinternational.com and links>, 10 pages, Copyright 1996, Printrak International Inc..

*Live–Scan Products: Tenprinter® 1133S* (visited Apr. 23, 1999) <http://www.digitalbiometrics.com/Products/tenprinter.htm>, 4 pages. (Tenprinter 1133S released in 1996).

*TouchPrint™ 600 Live–Scan System* (visited Apr. 23, 1999) <http://www.identix.com/products/livescan.htm>, 4 pages, Copyright 1996–1998, Identix Incorporated.

Systems for Live–Scan Fingerprinting, Digital Biometrics, Inc., 8 pages, Copyright 1998.

DBI FingerPrinter CMS, Digital Biometrics, Inc., 5 pages. (CMS released in 1998).

Fingerscan V20, Identix Incorporated, 1 page, Copyright 1999, Identix, Inc..

Verid® Fingerprint Reader, TSSI, 4 pages.

Response to Request for Information, Cross Match Technologies, Inc., 13 pages, Apr. 14, 1999.

*Startek's Fingerprint Verification Products* (visited Nov. 17, 1999) <http://www.startek.com.tw/product/index.html>, 1 page.

*Introduction to Startek's Fingerprint Verification Products* (visited Nov. 17, 1999) <http://www.startek.com.tw/product/index2.html>, 2 pages.

*Automatic Fingerprint Identification Systems* (visited Nov. 17, 1999) <http://www.sagem.com/en/produit4–en/empreinte–dig–en.htm>, 1 page.

*Digital Biometrics Corporate Information* (visited Nov. 17, 1999) <http://www.digitalbiometrics.com/Corporate_info/Corporate_info.htm>, 2 pages. (discusses technology as early as 1985).

*DBI Live–Scan Products: Digital Biometrics TEN-PRINTER®* (visited Nov. 17, 1999) <http://www.digitalbiometrics.com/products/tenprinter.htm>, 4 pages. (Tenprinter released in 1996).

*DBI Live–Scan Products: Networking Options* (visited Nov. 17, 1999) <http://www.digitalbiometrics.com/products/networking_options.htm>, 3 pages.

*DBI Live–Scan Products: Digital Biometrics FingerPrinter CMS*™ (visited Nov. 17, 1999) <http://www.digitalbiometrics.com/products/FingerPrinterCMS.htm>, 3 pages. (CMS released in 1998).

*DBI live–Scan Products: Image Printer Stations* (visited Nov. 17, 1999) <http://www.digitalbiometrics.com/products/imageprinter.htm>, 2 pages.

*DBI Live–Scan Products: FC–21™ Fingerprint Capture Station* (visited Nov. 17, 1999) <http://www.digitalbiometrics.com/products/Fingerprintcapture.htm>, 2 pages.

*Series 400 OEM Scanner* (visited Nov. 17, 1999) <http://www.ultra–scan.com/400.htm>, 3 pages. (Scanner released in 1996).

*USC Scanner Design* (visited Nov. 17, 1999) <http://www.ultra–scan.com/scanner.htm>, 4 pages. (scanner released in 1996).

*Series 500/600 Scanners* (visited Nov. 17, 1999) <http://www.ultra–scan.com/500.htm>, 3 pages. (Scanner released in 1996).

*Series 700 ID Station* (visited Nov. 17, 1999) <http://www.ultra–scan.com/700.htm>, 3 pages. (Scanner released in 1998).

*Identix: The Corporation* (visited Nov. 17, 1999) <http://www.identix.com/corporate/home.htm>, 2 pages, Copyright 1996–1998, Identix Incorporated.

*Biometric Imaging Products* (visited Nov. 17, 1999) <http://www.identix.com/products/bioimage.htm>, 1 page, Copyright 1996–1998, Identix Incorporated.

*TouchPrint™ 600 Live–Scan System* (visited Nov. 17, 1999) <http://www.identix.com/products/livescan.htm>, 4 pages, Copyright 1996–1998, Identix Incorporated.

*TouchPrint™ 600 Palm Scanner* (visited Nov. 17, 1999) <http://www.identix.com/products/palmscan.htm>, 3 pages, Copyright 1996–1998, Identix Incorporated.

*TouchPrint™ 600 Card Scan System* (visited Nov. 17, 1999) <http://www.identix.com/products/cardscan.htm>, 3 pages, Copyright 1996–1998, Identix Incorporated.

*Dermalog Key —The safest and easiest way of access control* (Last updated Jul. 18, 1998) <http://www.dermalog.de/Britain/Products/Key/key.htm>, 1 page.

*Dermalog Finger–ID Your small size solution for high security* (Last updated Jul. 18, 1998) <http://www.dermalog.de/Britain/Products/Finger/fingerid.htm>, 1 page.

*Mytec: Corporate* (visited Nov. 17, 1999) <http://www.mytec.com/corporate/>, 2 pages.

*Kinetic Sciences Inc. Fingerprint Biometrics Division* (visited Nov. 17, 1999) <http://www.kinetic.bc.ca/main.FP-B.html>, 1 page.

*Fingerprint Biometrics: Securing The Next Generation*, May 19, 1999, (visited Nov. 17, 1999) <http://ww.secugen.com/pressrel.htm>, 2 pages.

*SecuGen Unveils Fully Functional Fingerprint Recognition Solutions*, May 11, 1999, (visited Nov. 17, 1999) <http://www.secugen.com/pressrel.htm>, 3 pages, Copyright 1999 SecuGen Corporation.

*POLLEX Technology Ltd., The Expert in Fingerprint Identification—POLLog* (visited Nov. 17, 1999) <http://www.pollex.ch/english/products/pollog.htm>, 2 pages.

*Sony Fingerprint Identification Terminal* (visited Nov. 17, 1999) <http://www.iosoftware.com/biosols/sony/fiu/applications/fit100.htm>, 2 pages.

*Sony Fingerprint Identification Unit (FIU–700)* (visited Nov. 17, 1999) <http://www.iosoftware.com/biosols/sony/fiu700/index.htm>, 2 pages. (Unit available late 1999).

*Sony Fingerprint Identification Unit* (visited Nov. 17, 1999) <http://www.iosoftware.com/biosols/sony/fiu/index.htm>, 3 pages.

*Fujitsu Fingerprint Recognition Device (FPI–500)* (visited Nov. 17, 1999) <http://www.iosoftware.com/biosols/fujitsu/fpi550.htm>, 2 pages.

*Mitsubishi MyPass LP–1002* (visited Nov. 17, 1999) <http://www.iosoftware.com/biosols/mitsubishi/mypass.htm>, 2 pages.

*SecureTouch PV—A Personal "Password Vault"* (visited Nov. 17, 1999) <http://www.biometricaccess.com/securetouch_pv.htm>, 1 page.

*Digital Descriptor Systems, Inc. –Profile* (visited Nov. 17, 1999) <http://www.ddsi–cpc.com/pages/profile.html>, 3 pages.

*Press Release: Printrak International Announces New Portable Fingerprint ID Solution*, Dec. 10, 1996, (visited Nov. 17, 1999) <http://www.scott.net/~dg/25.htm>, 3 pages.

*Corporate Profile* (visited Nov. 17, 1999) <http://www.printrakinternational.com/corporate.htm>, 1 page.

*Printrak Products* (visited Nov. 17, 1999) <http://www.printrakinternational.com/Products.htm>, 1 page. (Discusses technology as early as 1974).

Verifier™ 200 Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.

Verifier 250 Small Footprint Direct Fingerprint Reader, Cross Check Corporation, 2 pages, 1996–1997.

Verifier™ 290 Fingerprint Capture Devices, Cross Match Technologies, Inc., 2 pages. 1996–1997.

Verifier 290 Direct Rolled Fingerprint Reader, Cross Check Corporation, 2 pages, 1996–1997.

Verifier™ 500 Fingerprint Capture Devices, Cross Match Technolgies, Inc., 2 pages, 1998.

Biometric terminal, 1 page.

10–Print Imaging System, Cross Check Corporation, 2 pages, 1998.

*Cross Match Technologies, Inc.* (visited Mar. 25, 1999) <http://www.crossmatch.net/>, 1 page.

*Cross Match Technologies, Inc.—Products Overview* (visited Mar. 25, 1999) <http://www.crossmatch.net/new/products/product–index.html>, 1 page.

*Cross Match Technologies, Inc—Law Enforcement Systems* (visited Mar. 25. 1999) <http://www.crossmatch.net/new/law/law–index.html>, 2 pages.

*Cross Match Technologies, Inc.—Commercial Systems: Building On The Standard* (visited Mar. 25, 1999) <http://www.crossmatch.net/new/commercial/commercial–index.html>, 2 pages.

*Cross Match Technologies, Inc.—International Sales* (visited Mar. 25, 1999) <http://www.crossmatch.net/new/sales/sales–index.html>, 1 page.

*Cross Match Technologies, Inc.—Support* (visited Mar. 25, 1999) <http://www.crossmtach.net/new/support/support-index.html>, 1 page.

*Cross Match Technologies, Inc.—News—Press Releases—Verifier 400 Press Release* (visited Mar. 25, 1999) <http://www.crossmatch.net/new/news/news-pr-050798.html>, 1 page.

*Global Security Fingerscan™ System Overview* (visited Jan. 11, 2000) <http://www.u-net.com/mbp/sol/g/a9.htm>, Fujitsu Australia Limited, 1995, Third Edition, 12 pages.

"Command Structure for a Low–Cost (Primitive) Film Scanner," *IBM Technical Disclosure Bulletin*, IBM Corp., vol. 35, No. 7, Dec. 1992, pp. 113–121.

*Fingerprint Scan API Tollkit Version 1.x Feature List* (Apr. 26, 2000) <http://ww.mentalix.com/api/archive_fapiv-l.htm>, 3 pages.

"Image Acquisition System," *IBM Technical Disclosure Bulletin*, IBM Corp., vol. 29, No. 5, Oct. 1986, pp. 1928–1931.

Kunzman, Adam J. and Wetzel, Alan T., "1394 High Performance Serial Bus: The Digital Interface for ATV," *IEEE Transactions on Consumer Electronics*, IEEE, vol. 41, No. 3, Aug. 1995, pp. 893–900.

*Mentalix Provides The First IAFIS–Certified Latent Print Scanning Solution For Windows* (Jul. 23, 1999) <http://www.mentalix.com/pressreleases/fprintplook3_prel.htm>, 2 pages.

Sluijs, F. et al., "An On–chip USB–powered Three–Phase Up/down DC/DC Converter in a Standard 3.3V CMOS Process," *2000 IEEE International Solid–State Circuits Conference*, IEEE, Feb. 9, 2000, pp. 440–441.

Venot, A. et al., "Automated Comparison of Scintigraphic Images," *Journal of Nuclear Medicine*, vol. 27, No. 8, Aug. 1986, pp. 1337–1342.

EPO Patent Abstract for Japanese Patent Publication No. 59–103474, published Jun. 14, 1984, 1 page.

EPO Patent Abstract for Japanese Patent Publication No. 10–079017, published Mar. 24, 1998, 1 page.

EPO Patent Abstract for Japanese Patent Publication No. 10–262071, published Sep. 29, 1998, 1 page.

EPO Patent Abstract for Japanese Patent Publication No. 11–167630, published Jun. 22, 1999, 1 page.

EPO Patent Abstract for Japanese Patent Publication No. 11–252489, published Sep. 17, 1999, 1 page.

\* cited by examiner

FIG.2

INDIVIDUALIZED FINGERPRINT SCANNER

This application is a continuation of, and claims the benefit of priority under 35 U.S.C. §120 to, application Ser. No. 09/067,792, filed Apr. 28, 1998, now U.S. Pat. No. 6,178,255, which is incorporated by reference herein in its entirety.

FIELD OF THE INVENTION

The instant invention is directed to the field of security control and, in particular, to the electronic acquisition of optical fingerprint images and the accurate and repeatable storage thereof.

BACKGROUND OF THE INVENTION

Prior art techniques for obtaining fingerprints have included application of ink to a person's fingertips and rolling or simply pressing the tips of the individual's fingers to appropriate places on a recording card. This system has severe limitations, the least of which is the use of ink which can often require several attempts before a usable image is obtained. Furthermore, use of an ink-based system requires cooperation of the individual from whom the prints are being taken, since blurring and smearing of the prints often occurs when attempts are made to obtain fingerprints from a hostile individual. Additionally, it is difficult to easily adapt inked prints for computerized storage and retrieval; thus making it difficult for various governmental agencies to reliably transfer and share data.

Several attempts have been made to optically acquire fingerprint images, however known systems have various drawbacks. In order to record data correctly, it is necessary to utilize trained personnel to aid the individual in guiding his/her fingers over the optical reading area. The fingers must be accurately positioned and the rate of rotation of the fingers must not exceed the recording abilities of the device. If the fingers are not rotated at the correct speed, data will be lost necessitating repeating of the entire procedure.

Several of these systems generate an optical image in real time, but they suffer from errors caused by their need to approximate the complete fingerprint image by electronically combining a plurality of smaller images or "slices" and smoothing the edges of the slices together to form an image which has the appearance of a full fingerprint. In performing the smoothing operation, a composite image is created which averages the data contained in the adjacent image slices, discarding discontinuities and artifacts so as to arrive at what can be described as a "best guess" image.

Improvements on this so-called "best guess" scenario have sought to provide overlapping slices wherein the image is formed by generating a composite array as a mathematical function of a comparison and an average of the overlapping data which constitutes the overlapping portions of adjacent slices. While this method more accurately characterizes transitions between the boundaries of adjacent image slices, the averaging of discontinuities and discarding of artifacts continues to prevent the obtention of images having the desired degree of accuracy and resolution. Such images still engender a degree of inaccuracy which, when coupled with the limits of resolution and recording inherent in the available hardware, render them unacceptable.

U.S. Pat. No. 4,933,976 discloses method for generating data characteristic of a rolled fingerprint image. The method requires storing arrays of digital data characteristic of adjacent and overlapping fingerprint images of portions of the finger as the finger is rolled across an optical device, the optical device capturing the image and generating a composite array of digital data characteristic of a rolled fingerprint image as a mathematical function of overlapping image portions of the fingerprint.

What is lacking in the art is a method and apparatus for reliably recording accurate high resolution electronic optical images of fingerprints without the necessity of adhering to critical sampling procedures. Such an invention would enable an untrained individual to accurately record fingerprint images which do not inherently contain unacceptable errors due to averaging of the image while processing.

SUMMARY OF THE INVENTION

The present invention is an improved method and apparatus for acquiring a high resolution electronic optical image of fingerprints. These images are then stored and indexed in a database which can be readily accessed by governmental agencies such that an individual can be easily identified. The invention employs the concept of moving a fingerprint over a viewing area and knitting the image together, in accordance with a simultaneously scanned and uniquely designed bar code.

By utilizing the bar code as a caliper, it is now possible to accurately and repeatable record and store high resolution optical images of fingerprints with no apparent loss of accuracy owing to the electronic knitting process. The caliper enables the microprocessing device to positively identify and organize each of the individual slices which make up the final image. It then becomes possible for an individual to rotate their fingertip in a back and forth motion, without concern for rotation speed, until such time as the device acquires accurate data for all of the required slices. The microprocessing device is then able to reassemble the recorded data by matching said data to the particular segments delineated by the fixed caliper gradations, and knitting the appropriate slices together so as to form a complete image of the fingerprint with minimal loss of resolution.

Thus, it is an objective of the present invention is to provide a method and apparatus whereby an untrained individual can accurately record electronic optical images of their fingerprints.

An additional objective of the present invention is to provide a method and apparatus whereby a fingerprint verifier has a mechanism to slide a prism over an imaged area of a camera. The position of the prism being determined by a binary absolute linear code on a sliding mechanism imaged by the same camera at the side of the fingerprint wherein the images are knitted together to simulate a large CCD.

It is an additional objective of the invention is to provide a method and apparatus whereby individual segments of data, having the attributes of portions of the image of a fingertip, may be accurately recorded in a random fashion and then reassembled so as to produce an accurate and coherent image of the original fingerprint.

Still another objective of the invention is to provide an apparatus that will operate in two modes, a) Roll print and b) 4 finger flat (which covers two thumbs).

Yet still another objective of the invention is to provide an apparatus that does not have a real time element allowing a user to roll as fast or as slow as they feel comfortable.

Another objective of the invention is to provide an apparatus whereby the individual drives the scanner mechanism, thereby eliminating the cost of a motor or the like drive mechanism for moving fingers over the scanner, or the scanner past the fingers.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2 is a conventional fingerprint card;

DESCRIPTION OF THE PREFERRED EMBODIMENT(S)

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
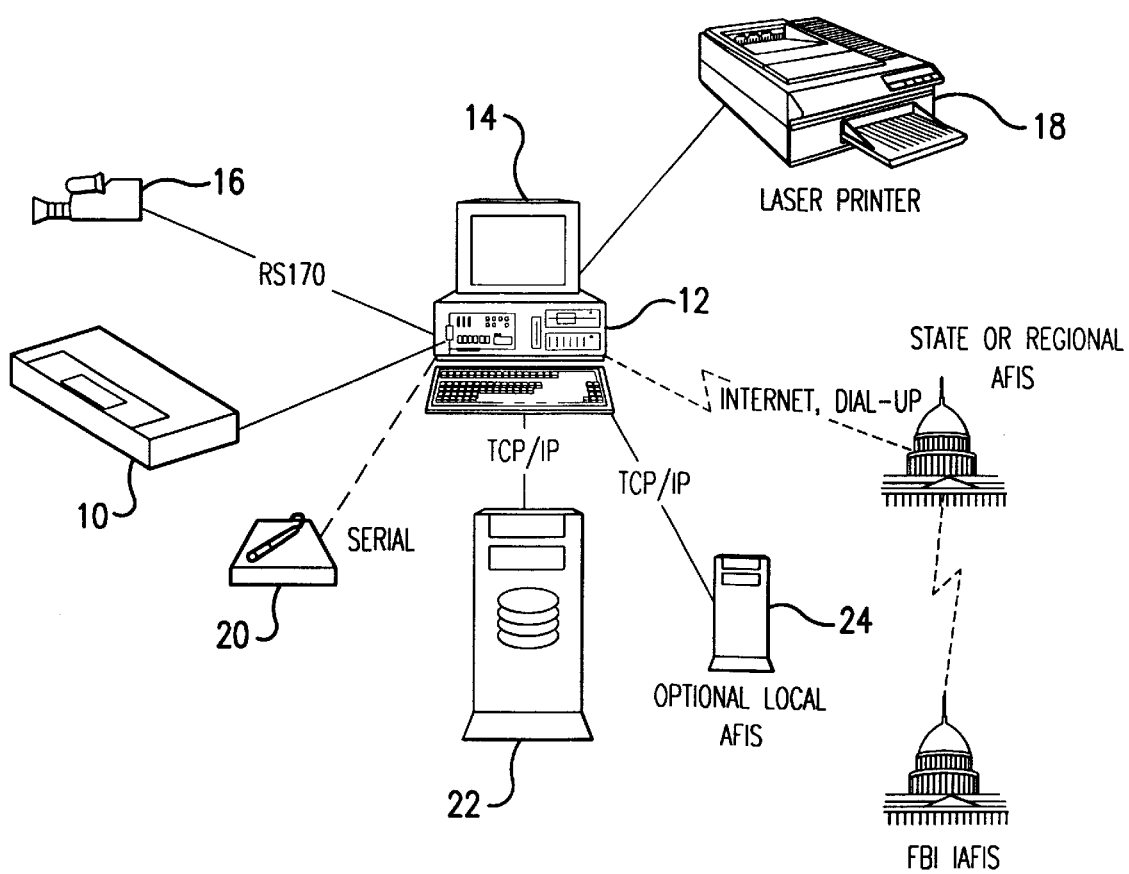
FIG. 1 is a pictorial view of the components and network used by the instant invention.

Referring now to FIG. 1, set forth is a pictorial of the invention and system comprising a scanner 10 coupled to a computer 12 having a PCI framegrabber board and monitor 14. The system may include a laser printer for local printout. An optional camera 16 may be used for identity verification. In addition, a signature tablet 20 provides another optional identity verification.

The scanner of the instant invention is developed primarily for use by criminal justice system to collect images of all ten prints of an individual that have been rolled from fingernail to fingernail. The purpose of collecting the prints is to place them in a database 22 where the individual can be recognized (identified). This is termed an AFIS (Automatic Fingerprint Identification System) or IAFIS (Integrated AFIS) system. A local AFIS 24 may also be used for states, cities, courts, or even businesses.

Figure 2:
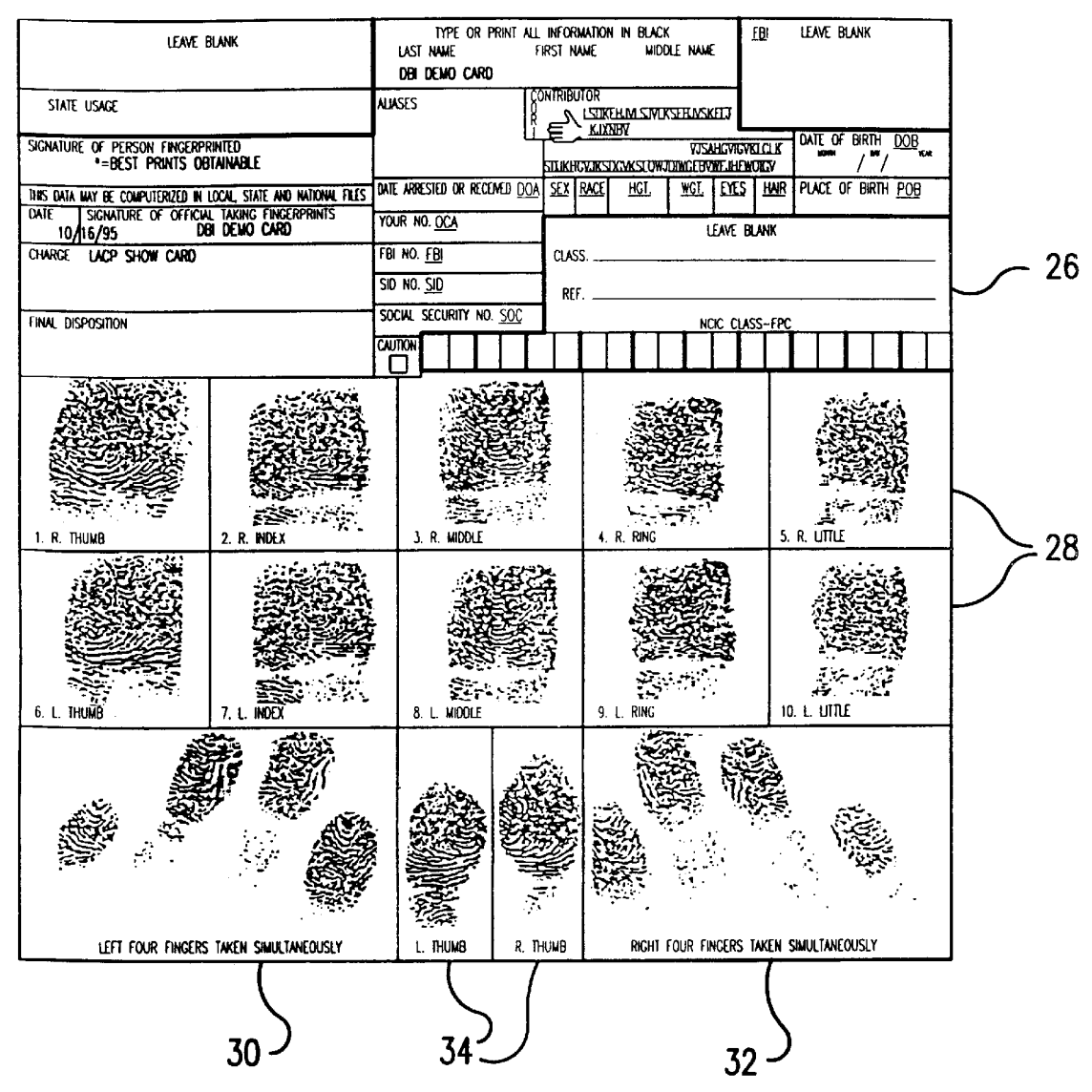

To place the individual in the database so he can be found at a later time, a classification system is used. Each print is classified as a loop arch etc. as defined by the NIS (National Institute of Standards) and stored in order of the finger and its classification. It is thus vital to have the classifications in the correct fingerprint sequence so that the images of both four finger flats and the two thumbs are taken and matched against the rolled prints to ensure sequence. As shown in FIG. 2, a typical fingerprint card 26 includes the individual digits 28 and an image of both four finger flats 30, 32 and the two thumbs 34. This allows a match between the hand and the individual digits.

Existing scanners use either 1 or two platens. One platen of dimensions of 1.5×2 inches is scanned by a 1000 by 800 pixel CCD camera which provides the required 500 dpi resolution specified by the FBI. A second platen of 1.6 to 2 inches by 4 inches is scanned at a lesser resolution to image the four finger flats or by a moving linear CCD to obtain 500 dpi. The costs of the existing 10 print scanners are thus burdened by a 1000×800 pixel CCD, mechanics and maintenance. The instant invention allows a low cost CCD camera to be used to image 1.5 inches by 4 inches of platen at 500 dpi by utilizing the concepts of knitting images using a moving prism.

Figure 3:
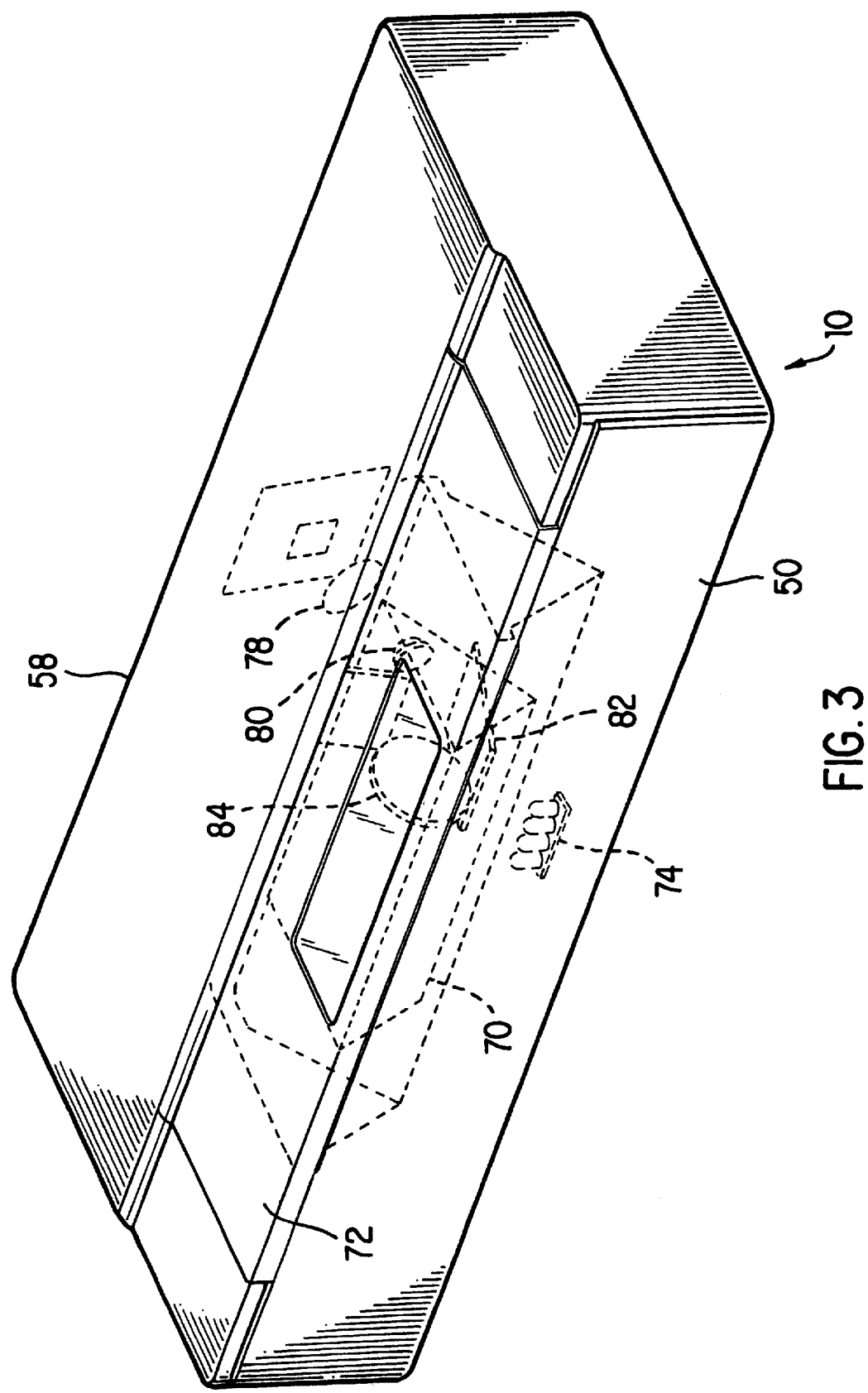
FIG. 3 is a cross sectional view of the fingerprint reader of the instant invention.
Figure 4:
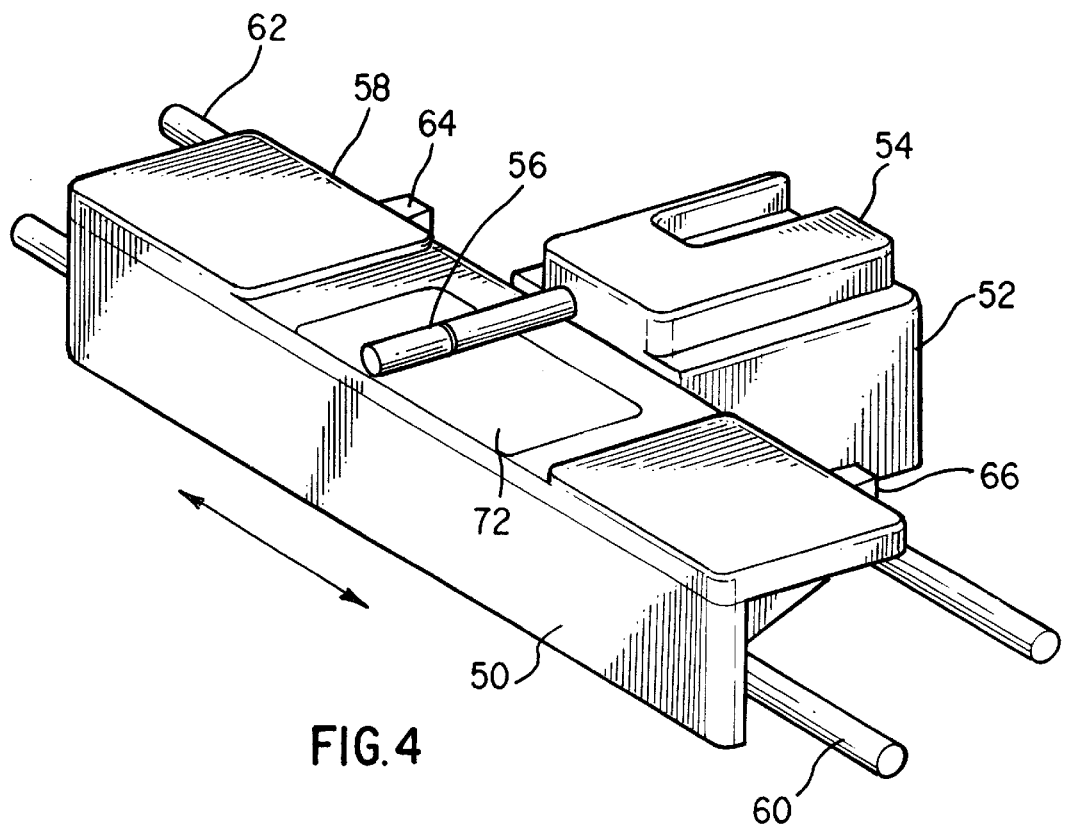
FIG. 4 is a perspective view of the fingerprint reader.
Figure 5:
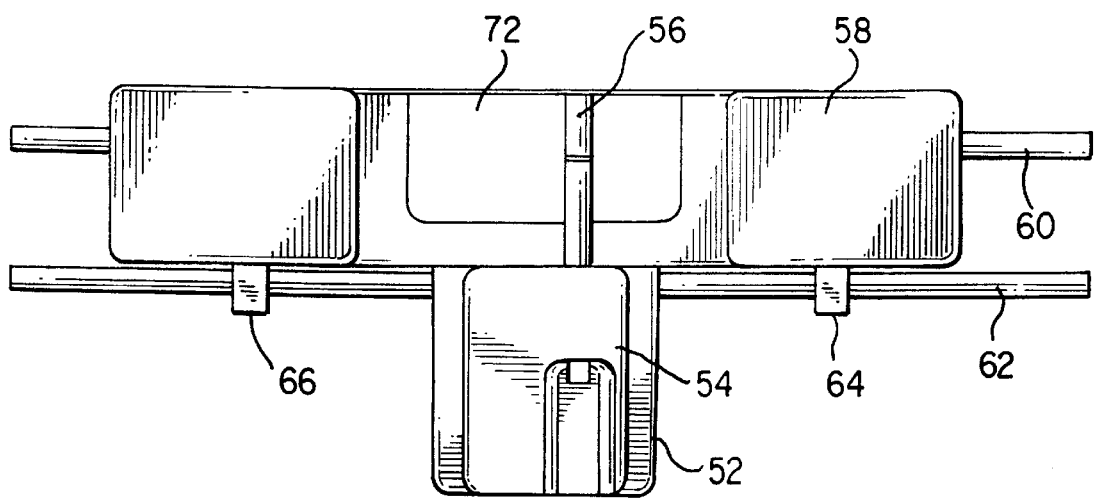
FIG. 5 is a top view of the fingerprint reader.
Figure 6:
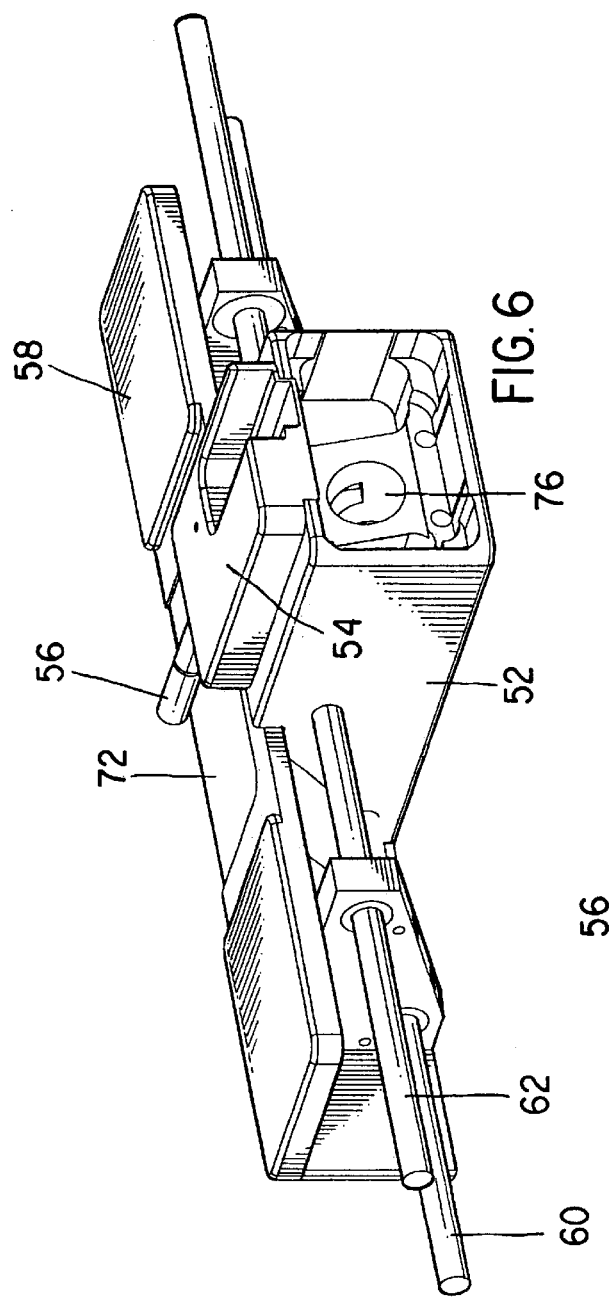
FIG. 6 is a perspective view of a back side of the fingerprint reader.
Figure 7:
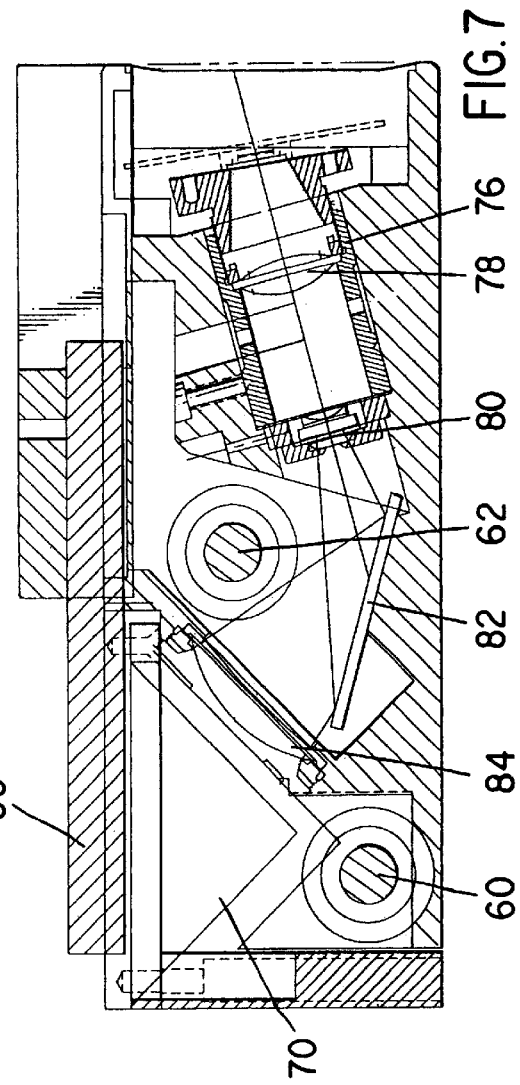
FIG. 7 is a cross sectional side view of the fingerprint reader.
Figure 8:
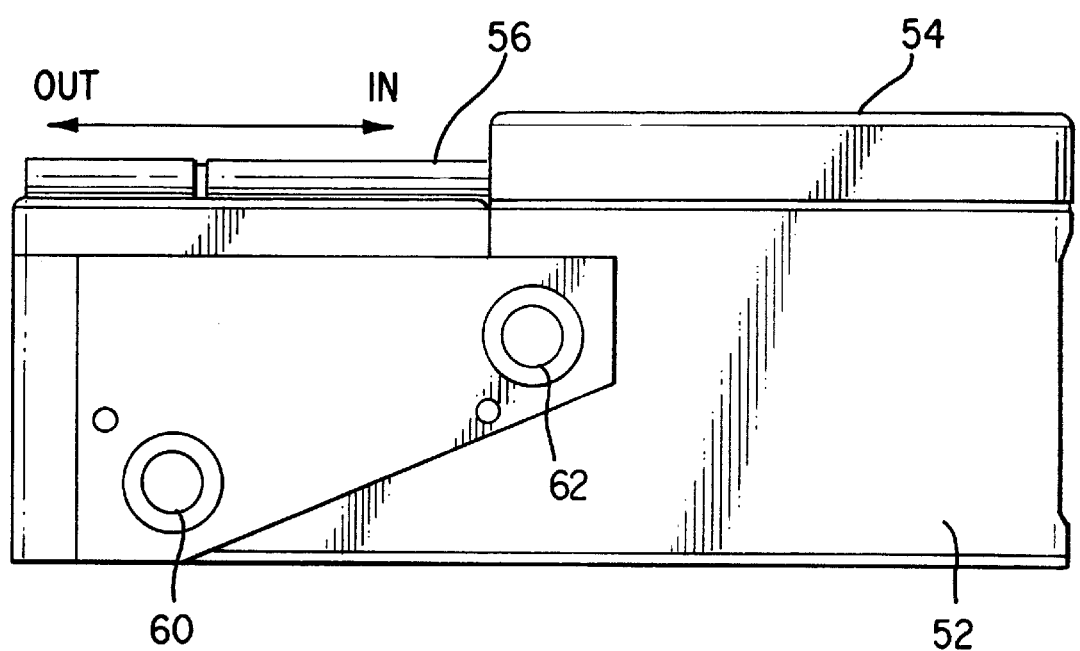
FIG. 8 is a side view of the fingerprint reader.
Figure 9:
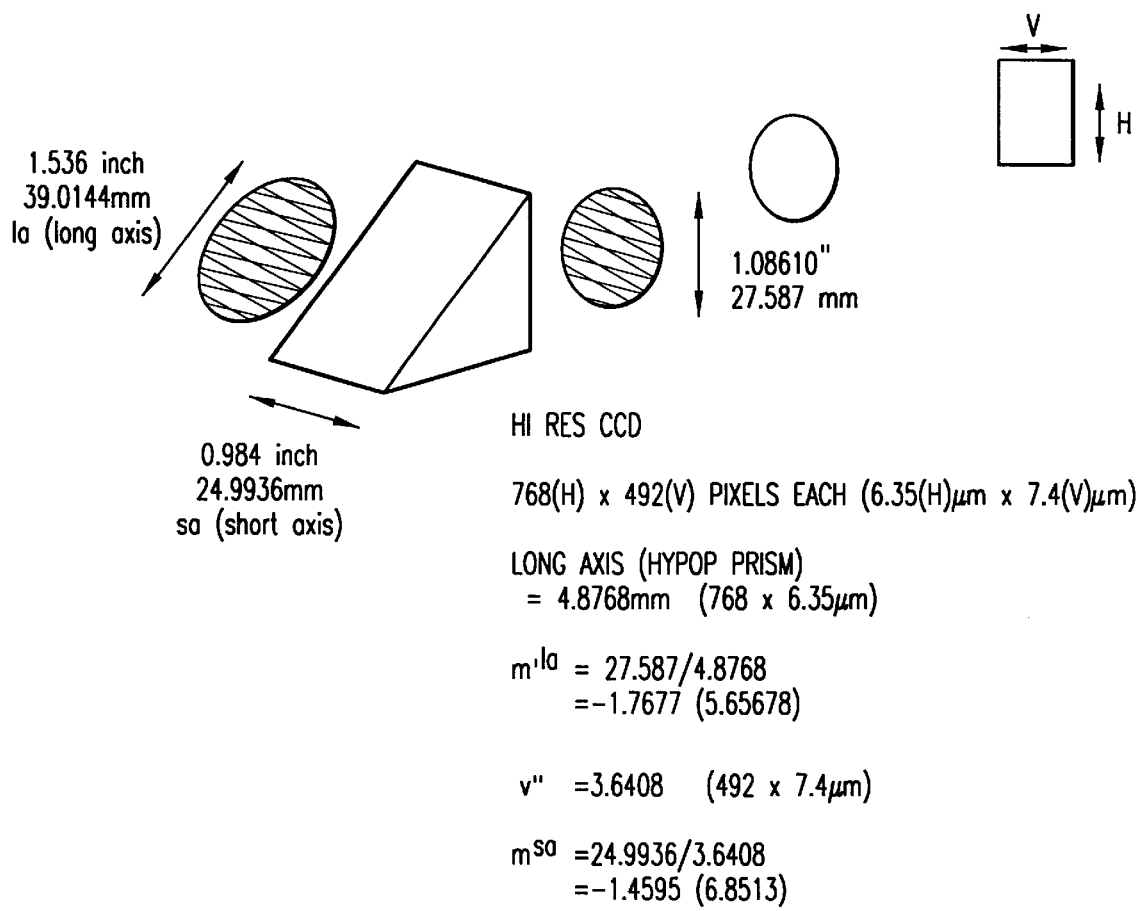
FIG. 9 is a pictorial view of the image process.

FIG. 3 shows a fingerprint reader means having a prism 70 with a first side surface exposed through a surface 72 of a housing with a second side surface of the prism positioned in the housing.

Referring in general to FIGS. 3–9, the scanner 10 is an electro-optical device preferably housed in a rugged metal box 20 having the approximate dimensions of 17 inches wide, 8 inches deep, and 4 inches high. The device can be weighted for secure positioning or affixed to a table top. The scanner 10 is further defined by a scanner body 52 with a finger guide mount 54 located thereon and a roll print finger guide 56. A movable platen assembly 58 slides along guide rods 60, 62 and is supported by platen carriers 64 and 66. The placement of the finger position rod 56 is an outward position as shown allowing for a single finger roll print. The scanner body 52 includes a prism 70 located beneath an optical platen 72. The optical platen will be about 1.5 inches by 4 inches active scanning area at 500 dpi with 256 shades of gray and conforming to the FBI requirements. A proximity sensor 64 initiates operation of a CCD or CMOS camera 76 to focus the fingerprint image by use of a first aspheric lens 78, which is directed through a second plastic aspheric lens 80 for reflection off a mirror folding optics 82 for direction through a third plastic aspheric lens 84. The prism 70 operates to change the focal length of the fingerprint allowing for ease of interpretation through the CCD or CMOS camera attachment section 76, the camera is not illustrated in this set of figures, as conventionally performed by fingerprint recognition devices. The prism and camera are further described an application previously filed by the Applicants and pending as U.S. Ser. No. 08/839,934 which is incorporated herein by reference.

In operation, the scanner will operate in two modes, which are different from the current industry protocols. For a roll print, the user will place his finger on the platen 72 next to the roller rod 56 and rotate the finger pressing into the cavity between the rod and glass. There is not a real time element and the user can roll as fast or as slow as they feel comfortable. The platen will accommodate a height of 1.5 inches and a length (circumference) of up to 1.6 inches. The XC DLL will sense the presence and absence of the print to start and stop the process and will knit real time to determine if the finger is rolling and at what speed. The resultant integrated image may be displayed real-time on a VGA screen.

Upon completion of the finger roll the XC DLL2 will extract the minutiae and output a quality level of the print. If the quality level were acceptable a GUI interface will prompt the user for the next print or ask for the roll to be repeated.

After ten roll prints of suitable quality have been collected the procedure moves to flat prints. The operator will move the finger guide 54 to a park position and the user will place his four flat prints on the platen 72 and slide his fingers over the viewing area (easily distinguished by a red glow). The XC DLL will knit the images together into a 4 inch by 1.5 inch image stored as 750×2000 pixels. The XC DLL2 will separate the four fingerprint images and extract and match them to the rolled images to check for sequence. If the matches are acceptable and in the correct sequence the user is prompted for the next hand by the GUI and the acquisition, extraction and matches and sequence checks are repeated. If successful the user is prompted for his two thumbs and the procedure repeated. If successful the 13 images are transferred to the aware software for incorporation into an ISO/ANSII NIST template for storage and/or uploading.

The scanner is coupled to a Graphical User Interface (GUI) and used to acquire a rolled print and output a knitted bitmap 3000 by 3200 pixels with resolution of 2000 dpi in 4196 shades of gray and reduced to 750 by 800 by 256 (DLL1). A flat print is used to acquire and output a bitmap 750 by 2000 pixels with resolution of 500 dpi and 4196 shades of gray and reduced to 256 shades of gray (DLL1). The matter is extracted and reported quality of image to trigger acceptance set in a configuration menu in INI (DLL2). The prints are matched and a report quality of match to trigger acceptance set in a configuration menu in INI (DLL2).

Figure 10:
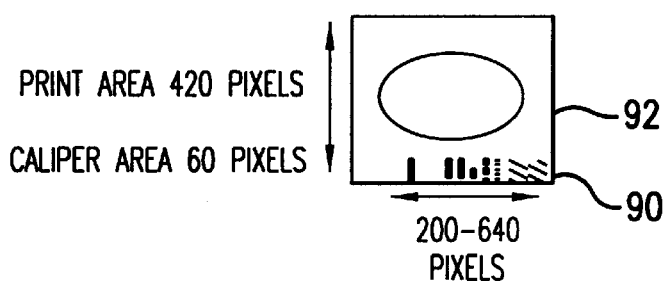
FIG. 10 is pixel illustration.
Figure 11:
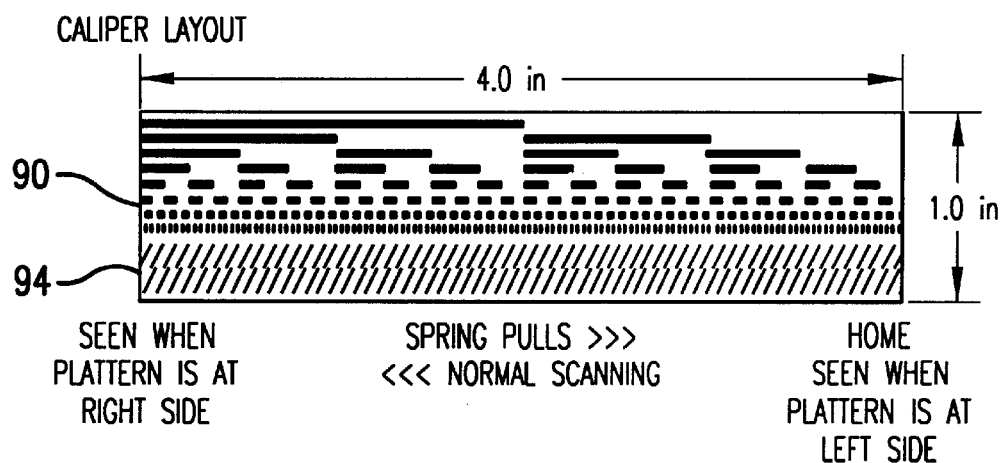
FIG. 11 is an illustration of the caliper layout.
Figure 12:
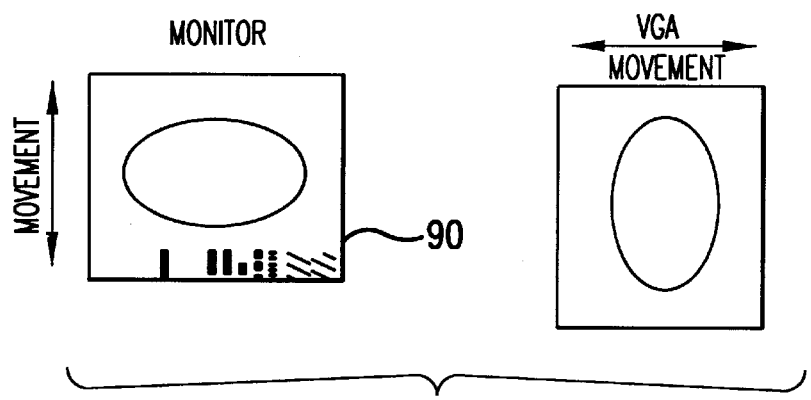
FIG. 12 is a pictorial of the image and layout.

Referring to FIGS. 10–12, the absolute position of a platen is determined by viewing a bar code (herein called the "caliper") attached to the platen. The bar caliper 90 appears at the bottom of the CCD viewing area 92. The CCD image is split with approximately 420 lines for the fingerprint and 60 lines for the caliper. The reference line in the image where the caliper is referenced to is address 450. This gives plus and minus 30 lines to perform its function. The resolution of the optics and CCD are about 3–5 pixels and the brightness and contrast vary the mark space ratios.

Four inches of travel need to be covered with an accuracy of better than a pixel at 500 dpi. Thus 2048 addresses are allocated which would require 12 bits of a binary code. As the resolution of the optics/camera does not permit this resolution a double diagonal is added to determine the least significant bits.

The diagonals cover 32 pixels horizontally and 32 pixels vertically and the second row is offset 16 pixels from the first row. The LSB theory is we search across the video lines 442 thru 460 in the area of the first diagonals saving the x location of the minimum gray scale. We average the x locations that will give us the x location at 450. That value will be the least significant 5 bits of the position. If the position is found to be close to the ends of the diagonal we move to the second row of diagonals to get a better reading.

The MSB theory is we have sufficient resolution to see if a black bar is in its assigned position. If we detect black in the assigned space we have a 1 (one) if we get white we have a zero. The only problem is at the ends of the bars we have an indeterminate gray scale where we need to determine if we are going from black to white or white to black so we know which edge we are on and we can use the least significant bits already determined from the LSB theory to establish which side of the edge we are on. We then scan the area of the binary bars (200,442–500,449) "Area C" and (200,450–500,559) "Area D" for the binary information. A combination of the least significant bits and the gray shade in the areas C and D will determine the binary value.

The value is used to select the useful area and position to place the area of images grabbed during a roll or swipe to create the composite image. The area selected from each image will be centered around line 240 and will be of a width that is half the displacement from the previous image and the half the displacement to the next image giving a minimum width to be laid down to minimize skew and possible distortion. A minimum displacement of 4 pixels from the last image is required before an image is qualified to be added. Thus the composite image can be made of slices of images from 8 to 420 pixels wide.

The displayed composite image will be displayed during acquisition to aid the user in its creation and will be rotated in the VGA display. If Black=1 and White=0, when the left side of the caliper target is viewed the caliper reads 2048 right side reads 0. The right side of the caliper target is viewed when the platen is to the left (start position). Target area C and D are defined to determine when the binary bars as going black to white and vice versa and are used in the logic. Target area C is above target area D in the video image and C views an area before D as the image is moved from top down as the platen moves from left to right. Absolute addresses in the bit map are given for clarity but they must be dealt with as parameters that may be changed in calibration procedures.

Figure 13:
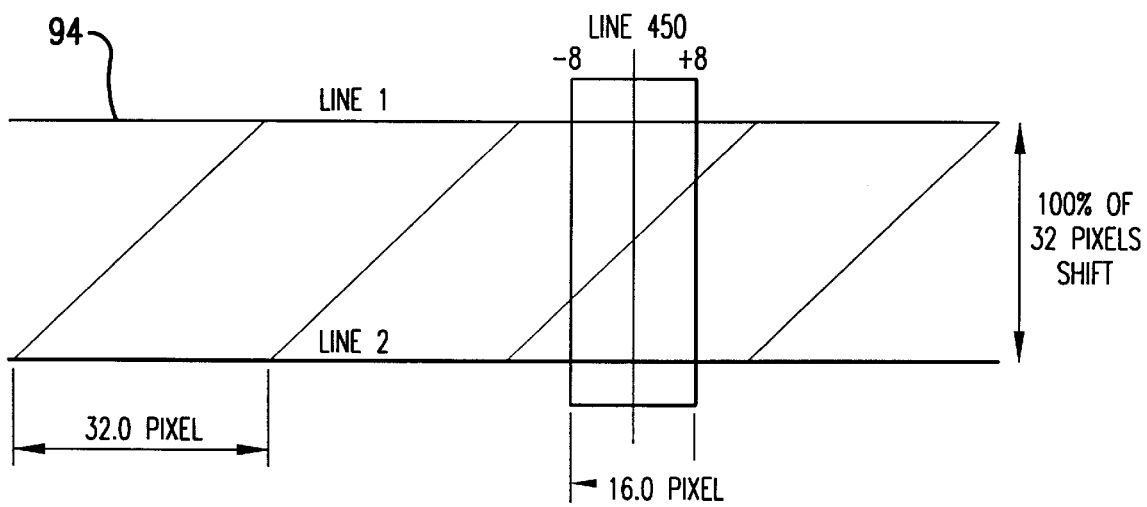
FIG. 13 is a pictorial of the image movement.
Figure 14:
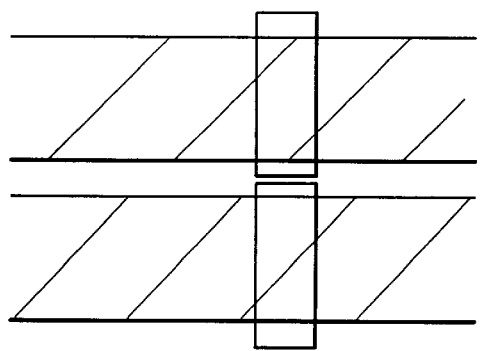
FIG. 14 is an enlarged image of the alignment portion of the caliper layout.

Referring to FIGS. 13–14, the errors in the binary bars are estimated to be removed by the 5 LSB's of the diagonals. The error in the diagonal must be calibrated by finding "line 1"'s X position of transection, the x transection of the diagonal and "line 2"'s X position of transection. The distance between line 1 and line two is 100% of 32 pixels. The position of the diagonal crossing is the ratio of the 32 pixels that is the LSB(5). This will self calibrate. If the transection of the diagonal occurs within say "8 pixels of line 1 or line two the position should be determined from the second row of diagonals.

| Process Detail is as follows: | |
|---|---|
| 1.0 | Find the lest significant 5 bits |
| 1.01 | find the minim gray level in line 442 from x = 500 to x = 570 and add the value of x to a temporary sum value "Diag_upper_Sum" |
| 1.02 | repeat 1.01 for lines 441 thru 449 accumulating the sum in "Diag_upper_Sum" |
| 1.03 | find the minim gray level in line 450 from x = 500 to x = 570 and add the value of x to a temporary sum value "Diag_lower_Sum" |
| 1.03 | repeat 1.03 for lines 451 thru 457 accumulating the sum in "Diag_lower_Sum" |
| 1.04 | divide "Diag_upper_Sum" by 10 and then subtract "Diag_L_Left edge" to get result to get "Diag_upper_average". |
| 1.05 | divide "Diag_lower_Sum" by 10 and then subtract "Diag_L_Left edge" to get result to get "Diag_lower_average". |
| 1.06 | if "Diag_upper_average" or "Diag_lower_average" are not less than 8 or nor greater than 24 sum "Diag_upper_average" and "Diag_lower_average" and divide by 2 and store as "Least_sig_5_Bits". |
| 1.07 | otherwise perform search for "Least_sig_5_Bits" on the second row of diagonals which will be better-centered by:- |
| 1.08 | find the minim gray level in line 442 from x = 580 to x = 640 and add the value of x to a temporary sum value "Diag_upper_Sum" |
| 1.09 | repeat 1.01 for lines 441 thru 449 accumulating the sum in "Diag_upper_Sum" |
| 1.10 | find the minim gray level in line 450 from x = 580 to x = 640 and add the value of x to a |

-continued

| | | Process Detail is as follows: |
|---|---|---|
| 1.11 | | temporary sum value "Diag_lower_Sum" repeat 1.03 for lines 451 thru 457 accumulating the sum in "Diag_lower_Sum" |
| 1.12 | | divide "Diag_upper_Sum" by 10 and then subtract "Diag_L_Left edge" to get result to get "Diag_upper_average". |
| 1.13 | | divide "Diag_lower_Sum" by 10 and then subtract "Diag_L_Left edge" to get result to get "Diag_lower_average". |
| 1.13.1 | | if "Diag_upper_average" or "Diag_lower_average" are not less than 8 or nor greater than 24 sum "Diag_upper_average" and "Diag_lower_average" and divide by 2 and store as "Least_sig_5_Bits". |
| 1.14 | | Otherwise flag a soft diag search error. |
| Bit 1 | 0 or 1 | Determined from diagonal |
| Bit 2 | 0 or 2 | Determined from diagonal |
| Bit 3 | 0 or 4 | Determined from diagonal |
| Bit 4 | 0 or 8 | Determined from diagonal and LSB of bar code* |
| Bit 5 | 0 or 16 | Determined from diagonal and NSB of bar code (mark = 16)** |
| Bit 6 | 0 or 32 | NSB of bar code (mark >=32)*** |
| Bit 7 | 0 or 64 | NSB of bar code (mark >=32)*** |
| Bit 8 | 0 or 128 | NSB of bar code (mark >=32)*** |
| Bit 9 | 0 or 256 | NSB of bar code (mark >=32)*** |
| Bit 10 | 0 or 512 | NSB of bar code (mark >=32)*** |
| Bit 11 | 0 or 1024 | MSB of bar Code (no choice)**** |

*Case 1 Bit 4 not used at this time (position taken from diagonal alone)

WHEN MARK = 8

** Case 2 Bit 5 (mark = 16)

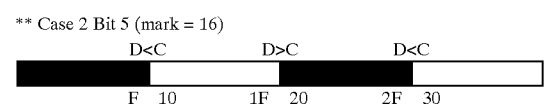

WHEN MARK = 16

*** Case 3 Bit 6 and up (mark > = 32)

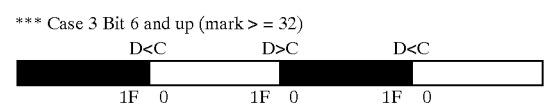

WHEN MARK > 32

**** Case 4 Bit 11

Bar only goes once from low to high in range 0–2048

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. An apparatus for capturing fingerprint images from a fingertip of at least one finger, comprising:

a line image device; and a moveable prism that moves in a linear motion along a scanning direction transverse to a length of the finger in response to movement of the finger during a scan, wherein said line image device detects a plurality of scan lines of a fingerprint image of the fingertip as the fingertip moves through an imaging area of the line image device, wherein each scan line extends in a direction along said finger length.

2. The apparatus of claim 1, further comprising:

at least one lens for directing said fingerprint image toward said line image device.

3. The apparatus of claim 1, wherein said apparatus further comprises a microprocessor to identify and assemble said plurality of scan lines into an integrated image of said fingertip, wherein said microprocessor extracts and reports quality of image and quality of match for the image of said fingertip to enable acceptance of the image.

4. The apparatus of claim 1, wherein said apparatus operates in a first mode for capturing a roll print and wherein said moveable prism moves along said scanning direction in response to a rolling of the fingertip relative to said moveable prism during the scan.

5. The apparatus of claim 1, wherein said apparatus operates in a second mode for capturing at least one flat print, wherein at least one fingertip is placed on the surface of said moveable prism and wherein said moveable prism moves along said scanning direction in response to linear movement of the fingertips during the scan.

6. The apparatus of claim 1, wherein the fingertip is in frictional contact with a surface of said moveable prism such that a rotational movement of the fingertip about a rotational axis along the length of the fingertip causes the moveable prism to move along said scanning direction.

7. The apparatus of claim 6, wherein the imaging area detected by the line image device extends along the length of the fingerprint in a direction parallel to the rotational axis of the fingertip.

8. The apparatus of claim 1, further comprising a protective layer on a surface of said moveable prism which receives the fingertip.

9. The apparatus of claim 8, wherein the protective layer comprises a platen attached to the surface of the moveable prism.

10. The apparatus of claim 1, wherein the moveable prism comprises a single prism.

11. An apparatus for acquiring fingerprint images, comprising:
- an optical platen having a transparent scanning area for placing one or more fingertips, wherein said optical platen is movable in a linear motion along a scanning direction in response to movement of a fingertip during a scan;
- a prism, said prism located beneath and attached to said optical platen;
- at least one lens for directing an image of one or more fingertips placed upon said platen toward a scan line camera, wherein said scan line camera captures a plurality of scan lines of said image of said one or more fingertips; and
- a microprocessor for identifying and assembling said plurality of scan line images to form said fingerprint images,
- wherein said apparatus operates in two modes for capturing a roll print and a four finger flat print.

12. The apparatus of claim 11, wherein said scan line images are randomly recorded.

13. The apparatus of claim 11, wherein roll prints for each finger are compared and matched to the fingerprint images obtained from the four finger flat print, and the order of the four fingerprints is verified.

14. The apparatus of claim 12, wherein said randomly recorded scan line images are archived when the quality of the image is acceptable.

15. The apparatus of claim 11, wherein quality of match is determined before said prints are accepted.

16. The apparatus of claim 11, wherein quality of image is determined after said prints are captured.

17. The apparatus of claim 11, wherein said scan line camera is a charge coupled device (CCD) camera.

18. The apparatus of claim 11, wherein said scan line camera is a CMOS camera.

19. The apparatus of claim 11, further comprising:
- a sensor for initiating operation of said scan line camera.

20. An apparatus for electronically capturing the attributes of an image of a fingertip, comprising:
- a moveable platen assembly that includes a platen surface at a prism;
- an optoelectronic device comprising a scan line camera for capturing segments of scanned data from said platen surface, and at least one lens for directing the image placed on said platen toward said scan line camera; and
- a microprocessor for identifying and assembling said segments of scanned data,
- wherein said microprocessor extracts and reports quality of image and quality of match for the image of the fingertip to trigger acceptance in a configuration menu,
- wherein said apparatus operates in two modes for capturing a roll print and a four finger flat print, each mode involving movement of said moveable platen assembly.

21. The apparatus of claim 20, wherein said microprocessor knits together an integrated image of said fingertip after assembling said segments of scanned data.

22. The apparatus of claim 20, further comprising:
- a sensor for initiating operation of said scan line camera.

23. The apparatus of claim 20, wherein said moveable platen assembly moves along a scanning direction in response to a finger being rotated.

24. The apparatus of claim 20, wherein said scanned data is randomly recorded.

25. The apparatus of claim 20, wherein the image of the fingertip is archived when the quality of the image is of an acceptable level.

26. The apparatus of claim 20, wherein said scan line camera is a charge coupled device (CCD) camera.

27. The apparatus of claim 20, wherein said scan line camera is a CMOS camera.

28. An apparatus for capturing fingerprint images, comprising:
- a line image device;
- a prism that moves linearly relative to said line image device, wherein said line image device detects at least a portion of a fingerprint image of a fingertip horizontally rotated on a platen surface of said prism in an imaging area of the line image device, wherein the fingertip is in frictional contact with the platen surface of said prism such that a horizontal rotational movement of the fingertip about a rotational axis along the length of the finger causes the prism to move in a linear motion along a first axis.

29. An apparatus for capturing fingerprint images, comprising:
- a line image device;
- a prism that moves linearly relative to said line image device in a horizontal direction, wherein said line image device detects at least a portion of a fingerprint image of one or more fingers placed on a platen surface of said prism in an imaging area of the line image device, wherein the one or more fingers are in frictional contact with the platen surface of said prism such that a horizontal movement of the one or more fingers in a direction transverse to a length of said one or more fingers causes the prism to move in a linear motion along the horizontal direction.

30. The apparatus of claim 1, wherein said moveable prism comprises a prism having two triangular bases and three rectangular sides.

31. The apparatus of claim 1, wherein said movable prism comprises a prism having polygons as bases and parallelograms as sides.

32. An apparatus for capturing identifying surface print images, comprising:
- a line image device;
- a moveable assembly that includes a single prism; wherein said moveable assembly moves in a linear motion along a scanning direction in response to movement of an object having a print during a scan, wherein said line image device detects a plurality of scan lines across the print as the object moves through an imaging area of the line image device transversely to a length of the object, wherein each scan line extends along a direction approximately perpendicular to the scanning direction; and
- a processor that receives data representing said plurality of scan lines and assembles said data into a composite surface print image.

33. The apparatus of claim 5 wherein four fingertips are placed on the surface of said moveable prism and said second mode of operation captures a four finger flat print.

34. An apparatus for capturing an image of at least one fingertip, comprising:
- a housing;
- an imaging surface having a surface area for contacting said at least one fingertip;
- an optoelectronic imaging device in a fixed position relative to the housing;
- an optical path extending between said imaging surface and said fixed optoelectronic imaging device such that said optoelectronic imaging device images only a portion of said surface area of said imaging surface intersecting with said optical path;

a guide mechanism attached to said imaging surface and said housing that guides said imaging surface through a range of manual movement relative to said optoelectronic imaging device while at least one fingertip is in contact with said imaging surface, such that movement of said at least one fingertip by a user manually moves said imaging surface to sequentially move different portions of said fingertip into said optical path for imaging by said optoelectronic imaging device; and a processor connected to the optoelectronic imaging device to receive data for a plurality of images collected during said movement of the fingertip and imaging surface and execute an algorithm to assemble said data for a plurality of images into data representing a composite image, wherein said processor has a first operating mode wherein said processor generates composite data representing a roll print when the user rolls a single fingertip across the imaging surface and a second operating mode wherein said processor generates composite data representing flat prints for multiple fingers when the user places a plurality of fingertips on said imaging surface and moves said imaging surface to move said plurality of fingertips across said optical path.

35. The apparatus of claim 34 further including a prism having a prism surface arranged at an angle to said imaging surface and located between said imaging surface and said optoelectronic imaging device.

36. The apparatus of claim 35 further including a finger guide adjacent to the imaging surface permitting the user to place said fingertip against both the imaging surface and the finger guide whereby said finger guide and said imaging surface guide said movement of the fingertip by the user in a rolling motion.

37. The apparatus of claim 34 wherein said imaging surface is a planar surface.

38. The apparatus of claim 34 further comprising:

position indicia moving in concert with said imaging surface, said indicia varying with its location on said imaging surface, and means for reading said position indicia and providing imaging surface position information to said processor to facilitate assembly of data collected at different imaging surface positions into composite image data.

39. An apparatus for capturing an image of at least one fingertip, comprising:

an imaging surface that receives a fingertip in contact therewith, said imaging surface having a surface area, an optoelectronic imaging device, an optical path extending between said imaging surface and said optoelectronic imaging device, said optical path including a prism surface of a prism, said prism surface arranged at an angle to said imaging surface, said prism surface located between said imaging surface and said optoelectronic imaging device and at least one lens, all arranged so that said optoelectronic imaging device has a fixed view along said optical path, a mechanism that allows movement of at least said imaging surface and said prism surface relative to said optoelectronic imaging device and said optical path while the fingertip is in contact with said imaging surface to sequentially move different portions of said fingertip into said optical path for imaging by said optoelectronic imaging device, and a processor connected to the optoelectronic imaging device to receive data for a plurality of images collected during movement of said fingertip and imaging surface and execute an algorithm that assembles said data into data representing a composite fingertip image.

40. The apparatus of claim 39 wherein said imaging surface is a planar surface.

41. The apparatus of claim 39 wherein said mechanism allows movement of said prism relative to said optoelectronic imaging device.

42. The apparatus of claim 41 wherein said prism extends between said prism surface and said imaging surface.

43. The apparatus of claim 39 wherein said mechanism is a manual mechanism where movement of the fingertip by a user drives said movement of said mechanism.

44. The apparatus of claim 39 wherein said imaging surface moves under the finger in response to rotation of the finger and said assembled data representing a composite fingertip image is roll print image data.

45. The apparatus of claim 44 further including a finger guide for supporting the fingertip during taking of a roll print so that the finger rolls against the imaging surface as the imaging surface moves relative to the optoelectronic imaging device.

46. The apparatus of claim 39 wherein said composite fingertip image is a flat print of at least one finger.

47. The apparatus of claim 46 wherein said surface area of said imaging surface is large enough to simultaneously accommodate a plurality of fingertips and said data representing a composite fingertip image is flat print data for said plurality of fingertips placed on said imaging surface.

48. The apparatus of claim 39 further comprising:

position indicia moving in concert with said imaging surface, said indicia varying with its location on said imaging surface, and means for reading said position indicia and providing imaging surface position information to said processor to facilitate assembly of data collected at different imaging surface positions into composite image data.

49. A method for capturing a roll print image of a fingertip, comprising the steps of:

providing an optoelectronic imaging device that images an optical path extending between the imaging device and an imaging surface, said imaging surface movable relative to said imaging device in response to finger movement, said imaging device imaging a portion of said imaging surface for each position of the imaging surface;

placing the fingertip on the imaging surface;

rotating the fingertip from side to side on the imaging surface to move the imaging surface relative to said optical path to present different portions of said fingertip to said optical path for imaging by said imaging device;

using said imaging device, collecting data for a plurality of images during said step of rotating the fingertip and assembling said data into data representing a composite roll print image.

50. The method of claim 49 wherein said imaging surface is a planar surface.

51. The method of claim 49 wherein said optical path includes a prism surface between said imaging device and said imaging surface, said prism surface arranged at an angle to said imaging surface.

52. The method of claim 51 wherein said prism surface is part of a prism in said optical path and said prism moves relative to said optical path in response to said finger movement.

53. The method of claim 52 wherein said prism extends between said prism surface and said imaging surface.

54. The method of claim 39 further comprising the step of supporting the fingertip to facilitate rolling the finger against the imaging surface as the imaging surface moves relative to the optoelectronic imaging device.

55. The method of claim 54 wherein said step of supporting the fingertip comprises the step of providing a finger guide that rotates relative to the imaging surface, and said step of rotating the fingertip comprises rolling the finger against both the imaging surface and the finger guide.

56. The method of claim 39 comprising the further steps of:
providing position indicia moving in concert with said imaging surface and varying with its location on said imaging surface, and
reading said position indicia and providing imaging surface position information to said processor to facilitate assembly of data collected at different imaging surface positions into composite image data.

57. An apparatus for capturing roll print fingerprint data for a fingertip, comprising:
imaging surface means for providing a surface against which the fingertip is placed for imaging, where said surface is movable and has a surface area;
imaging means for generating signals representing partial fingertip images appearing on a portion of said surface area along an optical path in a fixed direction of view;
guide means attached to said imaging surface means for guiding said imaging surface means through a range of movement relative to said imaging means while the fingertip is in contact with said imaging surface means such that rotational movement of the fingertip by a user manually moves said imaging surface means to sequentially present different portions of said fingertip into said optical path for imaging by said optoelectronic imaging device as said fingertip rolls; and
processing means connected to the imaging means for receiving a plurality of said signals representing partial fingertip images collected during said movement of the fingertip.

58. The apparatus of claim 57 further including prism means having a prism surface arranged at an angle to said imaging surface and located between said imaging surface and said imaging means.

59. The apparatus of claim 58 wherein said prism means is fixed with respect to said movable imaging surface.

60. The apparatus of claim 57 wherein said guide means further allows the user to move at least one fingertip transversely to the optical path so that movement of the fingertip sequentially presents to said imaging means images of portions of the fingertip as it moves across the optical path, and the processing means further comprises means for assembling image signal data to produce flat print data.

61. The apparatus of claim 60 wherein said movable imaging surface means simultaneously accommodates a plurality of fingertips in contact with said imaging surface means, said range of movement of said guide means permits movement of said plurality of fingertips across the optical path while said plurality of fingertips remain in contact with said imaging surface means.

62. The apparatus of claim 57 further including finger guide means adjacent to the imaging surface means for guiding said movement of the fingertip by a user in a rolling motion.

63. The apparatus of claim 62 wherein said finger guide means includes means for moving said finger guide means away from the imaging surface means to facilitate collection of flat prints.

64. The apparatus of claim 57 wherein said imaging surface means comprises a planar surface.

65. The apparatus of claim 57 further comprising:
position indicating means moving in concert with said imaging surface for providing image surface position information varying with indicia location on said imaging surface, and
means for reading said position indicia and providing said imaging surface position information to said processing means to facilitate assembly of data collected at different imaging surface positions into composite image data.

66. An apparatus for capturing flat print fingerprint data for a plurality of fingertips, comprising:
movable imaging surface means for providing a surface to accommodate the plurality of fingertips placed against said surface for imaging, said surface having a surface area;
imaging means for generating signals representing an image of a portion of said surface area along an optical path in a fixed direction of view;
guide means attached to said imaging surface means for guiding said imaging surface means through a range of movement relative to said imaging means while the plurality of fingertips are in contact with said imaging surface means such that movement of the fingertips by a user manually moves said imaging surface means to sequentially present different portions of said fingertips to said optical path for imaging by said optoelectronic imaging device, and
processing means connected to the imaging means to receive said signals for a plurality of partial fingertip images collected during said movement of the fingertips and assemble said partial fingertip images into data representing composite flat prints of the plurality of fingertips.

67. The apparatus of claim 66 further including prism means having a prism surface arranged at an angle to said imaging surface and located between said imaging surface and said imaging means.

68. The apparatus of claim 67 wherein said prism means is fixed with respect to said movable imaging surface means.

69. The apparatus of claim 66 wherein said range of movement of said guide means permits movement of said plurality of fingertips across the optical path while said plurality of fingertips remain in contact with said imaging surface means.

70. The apparatus of claim 66 further including finger guide means adjacent to the imaging surface means for guiding said movement of the fingertip by a user in a rolling motion and said processing means further includes means for assembling composite roll print data.

71. The apparatus of claim 70 wherein said finger guide means includes means for moving said finger guide means away from the imaging surface means to facilitate collection of flat prints.

72. The apparatus of claim 66 wherein said imaging surface means comprises a planar surface.

73. The apparatus of claim 66 further comprising:
position indicating means moving in concert with said imaging surface for providing image surface position information varying with indicia location on said imaging surface, and
means for reading said position indicia and providing said imaging surface position information to said processing means to facilitate assembly of data collected at different imaging surface positions into composite image data.

* * * * *